UNITED STATES PATENT OFFICE.

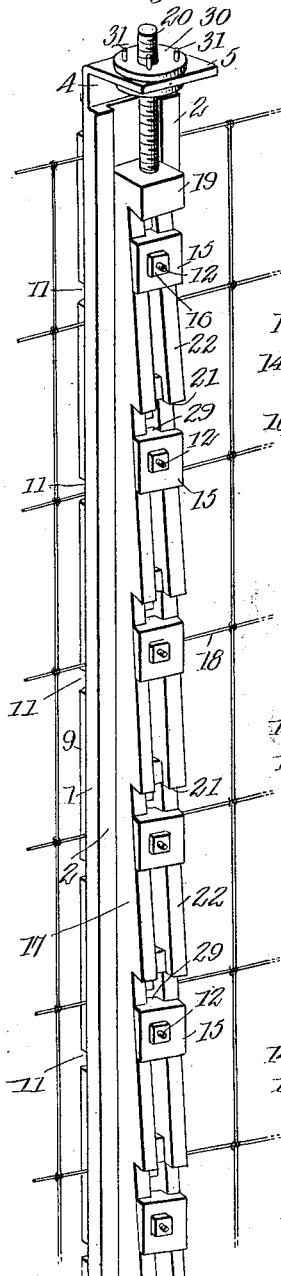

ISAAC L. BEVERAGE, ARCHIBALD C. SUDDARTH, AND HARRY B. WOOD, OF MONTEREY, VIRGINIA.

CLAMP.

1,058,535.  Specification of Letters Patent.  Patented Apr. 8, 1913.

Application filed March 28, 1912. Serial No. 686,735.

*To all whom it may concern:*

Be it known that we, ISAAC L. BEVERAGE, ARCHIBALD C. SUDDARTH, and HARRY B. WOOD, citizens of the United States, and residents of Monterey, in the county of Highland and State of Virginia, have invented certain new and useful Improvements in Clamps, of which the following is a specification.

Our invention is an improvement in clamps, and has for its object, the provision of a device of the character specified, especially adapted for supporting woven wire fences, wherein means is provided for clamping the entire width of the fence with a uniform pressure.

In the drawings: Figure 1 is a perspective view of the improvement in place; Fig. 2 is an enlarged longitudinal section of a portion of the clamp; Fig. 3 is a perspective view of a part of one of the holding plates or jaws; Fig. 4 is a similar view of the other holding plate or jaw; Fig. 5 is a similar view of clamping mechanism; Fig. 6 is a similar view of one of the washers; Fig. 7 is a transverse section of the improvement, on the line of one of the bolts. Fig. 8 is a plan view of a modified form of slotted plate; and Fig. 9 is a similar view of another modification.

In the present embodiment of the invention, a supporting guide plate 1 is provided, having a longitudinally extending rib 2 at each side edge, the ribs forming a groove or guideway 3, for receiving the operating bar to be described. The plate is of any desired length, and at its upper end the plate is reduced in thickness across its entire width, as shown at 4. The extremity of the reduced portion is bent over at right angles to the body of the plate, to form a lateral lug 5, and the said lug is provided with an opening 6. The plate is also provided with a longitudinal series of transverse openings 7 between the ribs and at the center of the groove, for receiving sleeves or bushing 8.

The opposite face of the plate from the groove and ribs acts as one of the gripping or clamping faces or jaws, and the other face or jaw is in the form of a plate 9, of suitable length, and of approximately the same width as the plate 1. The plate 9 is provided at spaced intervals with L-shaped slots, each of which is composed of a vertical portion 10, connected at its lower end to one side edge of the plate by a horizontal portion 11. The portions 11 of the L-shaped slots open at the same side edge of the plate, and the spacing of the openings of the said portions corresponds to the spacing of the openings 7. The rear end of each of the sleeves or bushings 8 extends into one of the slots, and a screw bolt 12 passes through each slot and the adjacent bushing. The bolts 12 are of greater length than the bushings 8, and extend beyond the bushings at both ends. A washer 13 encircles each bolt between the head 14 and the adjacent face of plate 9, and a washer 15 encircles each bolt between the opposite end of the bushing and the nut 16 of the bolt.

The operating bar 17 for clamping the plates 1 and 9 together on the horizontal wires 18 of the fence is of a width to permit it to fit and slide between the ribs 2 in the groove or guideway 3 of plate 1. The said bar is provided with a head 19 at its upper end, from which extends upwardly a threaded stem 20, the stem passing through the opening 6 of the lug 5. The front or outer face of the bar is provided with a plurality of shoulders or ledges 21, each of which is inclined to the rear face of the bar, and the said shoulders are spaced apart at equal distances, the spacing corresponding to that of the openings 7 and slots 11.

The inner edge of each shoulder is connected to the outer edge of the succeeding or next lower shoulder, by means of an incline or cam surface 22. The shoulders 21 are parallel, as are also the incline or cam surfaces 22. The shoulders and cam surfaces are formed by cutting the front face of the bar.

The bar is longitudinally slotted, between the adjacent shoulders, as shown at 23, each slot extending from the front to the rear face of bar. The portions 24 of the bar between the adjacent ends of the slots is of less thickness than the thickness of the bar, so that at the shoulders 21 the front ends of the said portions 24 are spaced rearwardly or inwardly from the front edges of the inclined portions, as shown at 25. Each of the said portions 24 is also recessed or notched inwardly in line with the adjacent shoulder, as shown at 26. The washers 15 are rectangular, and each washer is of greater thickness at its upper edge than at its lower edge, as shown more particularly in Fig. 6. The washers are in fact approximately wedge-shaped, the large end of the wedge being upward, and the said upper edge 27 of the washer is inclined or beveled to fit the shoulder 21.

Each washer 15 has a central opening 28 for the bolt 12, and has a pair of lugs 29 on its inner face, one lug being arranged above and one below the opening 28. The lugs fit the slots 23, and act as a guide for preventing angular movement of the washer on the bolt, so that the thick end of the washer is always upward.

The bar is as before stated arranged in the groove or guideway 3, and the bolts 12 and bushings 8 extend through the slots 23, so that the bar may move vertically with respect to the plates 1 and 9. The bar is moved by any suitable mechanism, in the present instance by means of a nut 30 engaging the stem 20.

The nut is journaled for rotation in the opening 6 of the lug 5, of plate 1, and is provided on its upper face with spaced pins 31, for engagement by a tool to rotate the nut. It will be evident that when the nut is rotated the bar will be moved vertically, the direction depending upon the direction of movement of the nut.

In operation, the plate 9 may be removed, by first lowering bar 17, and afterward moving the plate upwardly and laterally to disengage bolts 12 from the slots 10—11. The plate 1 is then placed in proper position with respect to the wires 18, and the plate 9 is replaced on the bolts on the opposite side of the wires from the plate 1. The nuts 16 are adjusted on bolts 12, in approximately the position of Fig 2, so that bar 17 may be lowered a sufficient distance to release plate 9. After the parts are positioned as described, nut 30 is rotated in a direction to elevate bar 17. As the bar moves upward, the washers 15 are moved away from washers 13, thus clamping the plates 1 and 9 firmly on the wires 18.

The wires may be clamped as tightly as desired, and are absolutely immovable when so clamped. The device may be made to fit any height of fence, and fit any spacing of wires. It is easily applied, and as easily removed, and when in place, there is no possibility of the wires becoming disengaged.

In the modified construction shown in Fig. 8, the slots 11ª of the plate 9ª are straight, and transverse to the plate. In the plate 9ᵇ shown in Fig. 9, the slots are approximately T-shaped, consisting of a portion 11ᵇ transverse to the plate, and a portion 11ᶜ transverse to the portion 11ᵇ and longitudinal of the plate. Either of the plates shown in the said figures may be substituted for the plate 9 of Fig. 3. The operation with the plates 9ª and 9ᵇ is precisely the same as with the plate 9, the difference being only of construction.

We claim:

1. In a clamp comprising a plate having a longitudinal groove on one face, and a longitudinal series of openings at the center of the groove, a bushing in each opening extending beyond both faces of the plate, a bolt passing through each bushing, a washer on the bolt at each end of the bushing, a nut engaging the bolt, a plate on the opposite face of the first-named plate from the groove and provided with a series of L-shaped slots, the slots opening at one side edge of the plate, and an operating bar slidable in the groove, said bar having a longitudinal series of longitudinal slots for receiving the bushings, the outer face of the bar having a series of spaced transverse shoulders and an incline or cam surface connecting each adjacent pair of shoulders, said surfaces being parallel, each of the washers at the outer face of the bar having lugs for engaging the adjacent slot of the bar to prevent angular movement of the washer, and means for moving the bar in the groove, said means comprising a nut journaled on the first named plate, and a threaded stem on the bar engaging the nut, the shoulders facing in the opposite direction to the means for moving the bar in the groove.

2. A clamp comprising a plate having a longitudinal groove on one face, and a longitudinal series of openings at the center of the groove, a bushing in each opening extending beyond both faces of the plate, a bolt passing through each bushing, a washer on the bolt at each end of the bushing, a nut engaging the bolt, a plate on the opposite face of the first-named plate from the groove and provided with a series of L-shaped slots, the slots opening at one side edge of the plate, and an operating bar slidable in the groove, said bar having a longitudinal series of longitudinal slots for receiving the bushings, the outer face of the bar having a series of spaced transverse shoulders and an incline or cam surface connecting each adjacent pair of shoulders, said surfaces being parallel, each of the washers at the outer face of the bar having lugs for engaging the adjacent slot of the bar to prevent angular movement of the washer, and means for moving the bar in the groove, the shoulders facing in the opposite direction to the means for moving the bar in the groove.

3. A clamp comprising a plate having a longitudinal guideway on one face, a second plate on the opposite face of the first-named plate from the guideway, said second plate having a longitudinal series of L-shaped slots opening at one side of the plate, a bar slidable in the guideway, said bar having a plurality of longitudinally extending slots and an inclined cam surface on its outer face adjacent to each slot, and shoulders between the adjacent ends of the cam surfaces, said surfaces and shoulders being parallel, a bolt passing through each L-shaped slot and the adjacent slot of the bar, a washer on each end of each bolt, the washers adjacent to the cam surfaces having means for preventing their rotation, and means for moving the bar.

4. A clamp comprising a plate having a longitudinal guideway on one face, a second plate on the opposite face of the first-named plate from the guideway, said second plate having a longitudinal series of L-shaped slots opening at one side of the plate, a bar slidable in the guideway, said bar having a plurality of longitudinally extending slots and an inclined cam surface on its outer face adjacent to each slot, and shoulders between the adjacent ends of the cam surfaces, said surfaces and shoulders being parallel, a bolt passing through each L-shaped slot and the adjacent slot of the bar, a washer on each end of each bolt, and means for moving the bar.

5. A clamp comprising a pair of plates, one of the plates having a longitudinal series of longitudinally extending slots, each slot opening laterally of the plate at one end of the slot, the other plate having an opening registering with each slot and a longitudinal guide way, a bolt extending through each pair of registering slots, a washer at each end of each bolt for engaging the adjacent plate to prevent longitudinal movement of the bolt, and means movable in the guideway between the plate and the adjacent washers for moving the washers away from the plate to clamp the plates together, said means comprising a bar having slots for the bolts and having inclined parallel cam surfaces for engaging the washers.

6. A clamp comprising a pair of plates, one of the plates having a longitudinal series of longitudinally extending slots, each slot opening laterally of the plate at one end of the slot, the other plate having an opening registering with each slot and a longitudinal guide way, a bolt extending through each pair of registering slots, a washer at each end of each bolt for engaging the adjacent plate to prevent longitudinal movement of the bolt, and means movable in the guideway between the plate and the adjacent washers for moving the washers away from the plate to clamp the plates together.

7. A clamp for wire fences comprising a pair of plates adapted to engage opposite sides of the fence, and means for clamping the plates on the wires, said means comprising bolts extending through the plates, and a bar slidable on one of the plates, and having a plurality of inclined faces, each bolt having a washer engaging one of the faces.

ISAAC L. BEVERAGE.
ARCHIBALD C. SUDDARTH.
HARRY B. WOOD.

Witnesses:
W. B. BISHOP,
J. H. PRUITT.

Copies of this patent may be obtained for five cents each, by addressing the "Commissioner of Patents, Washington, D. C."